(12) United States Patent
Wolpert et al.

(10) Patent No.: US 10,885,260 B1
(45) Date of Patent: Jan. 5, 2021

(54) FIN-BASED FILL CELL OPTIMIZATION

(71) Applicant: INTERNATIONAL BUSINESS MACHINES CORPORATION, Armonk, NY (US)

(72) Inventors: David Wolpert, Poughkeepsie, NY (US); Timothy A. Schell, Cary, NC (US); Michael Gray, Fairfax, VT (US); Erwin Behnen, Austin, TX (US); Robert Mahlon Averill, III, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/559,981

(22) Filed: Sep. 4, 2019

(51) Int. Cl.
*G06F 30/398* (2020.01)
*H01L 27/088* (2006.01)
*H01L 27/02* (2006.01)
*G06F 30/392* (2020.01)
*G06F 30/394* (2020.01)

(52) U.S. Cl.
CPC .......... *G06F 30/398* (2020.01); *G06F 30/392* (2020.01); *G06F 30/394* (2020.01); *H01L 27/0207* (2013.01); *H01L 27/0886* (2013.01)

(58) Field of Classification Search
CPC .... G06F 30/392; G06F 30/394; G06F 30/398; G06F 30/39; H01L 27/0207; H01L 27/0886
USPC .................................... 716/110–111, 122, 52
See application file for complete search history.

(56) References Cited

U.S. PATENT DOCUMENTS

| | | | |
|---|---|---|---|
| 5,140,402 A | 8/1992 | Murakata | |
| 5,901,065 A | 5/1999 | Guruswamy et al. | |
| 5,995,734 A | 11/1999 | Saika | |
| 7,207,022 B2 | 4/2007 | Okudaira | |
| 7,797,646 B2 | 9/2010 | Chung et al. | |
| 7,917,872 B2 | 3/2011 | Tanefusa et al. | |
| 8,826,212 B2 | 9/2014 | Yeh et al. | |
| 9,262,570 B2 | 2/2016 | Hsu et al. | |
| 9,703,911 B2 | 7/2017 | Shin | |
| 9,779,197 B1 | 10/2017 | Wagner et al. | |

(Continued)

OTHER PUBLICATIONS

Transmittal Form PTO/SB/21 signed Mar. 17, 2020.
(Continued)

*Primary Examiner* — Paul Dinh
(74) *Attorney, Agent, or Firm* — Cantor Colburn LLP; William Kinnaman

(57) ABSTRACT

Methods, systems and computer program products for providing fin-based fill cell optimization are provided. Aspects include receiving a semiconductor layout comprising at least a first logic cell, a second logic cell, and a fill cell. A left boundary of the fill cell is adjacent to the first logic cell and a right boundary of the fill cell is adjacent to the second logic cell. Aspects also include determining a number of active left fins, right fins, and active fill cell fins associated with FinFET structures of the first logic cell, second logic cell and fill cell, respectively. Aspects also include comparing the number of active fins to a set of fin rules. Responsive to determining that the semiconductor layout violates the set of fin rules, aspects include modifying the semiconductor layout to change the number of active fill cell fins to satisfy the set of fin rules.

20 Claims, 10 Drawing Sheets

(56) References Cited

U.S. PATENT DOCUMENTS

| | | | |
|---|---|---|---|
| 9,792,397 | B1 | 10/2017 | Nagaraja |
| 2003/0233625 | A1 | 12/2003 | Brazell et al. |
| 2012/0278781 | A1* | 11/2012 | Wann .................. G06F 30/39 |
| | | | 716/122 |
| 2014/0167818 | A1 | 6/2014 | Eisenstadt |
| 2014/0215420 | A1 | 7/2014 | Lin et al. |
| 2014/0258961 | A1 | 9/2014 | Ke et al. |
| 2017/0287909 | A1 | 10/2017 | Oh et al. |
| 2017/0371994 | A1* | 12/2017 | Bowers ............... H01L 27/0207 |
| 2018/0004882 | A1 | 1/2018 | Hsieh et al. |
| 2018/0137232 | A1* | 5/2018 | Hsieh .................. G06F 30/392 |
| 2019/0188353 | A1 | 6/2019 | Correale, Jr. et al. |
| 2019/0340324 | A1 | 11/2019 | Wolpert et al. |
| 2019/0378831 | A1* | 12/2019 | Okagaki ............. G06F 30/394 |
| 2020/0006335 | A1* | 1/2020 | Zhuang ............... H01L 27/0207 |

OTHER PUBLICATIONS

Ghaida et al., "Comprehensive Die-Level Assessment of Design Rules and Layouts," CiteSeerX.ist.psu.edu; URL: http://citeseerx.ist.psu.edu/viewdoc/download?doi=10.1.1.689.3757&rep=rep1&type=pdf; Retrieved Jun. 19, 2019; 6 pages.

Wolpert et al., "Front-End-Of-Line Shape Merging Cell Placement and Optimization," U.S. Appl. No. 15/969,841, filed May 3, 2018.

Disclosed Anonymously, "Heuristic Method for Power Density & Temperature Profile Refinement", IPCOM000228803D, Date: Jul. 8, 2013, 15 pages.

List of IBM Patents or Patent Applications Treated as Related; (Appendix P); Date Filed: May 27, 2020, 2 pages.

\* cited by examiner

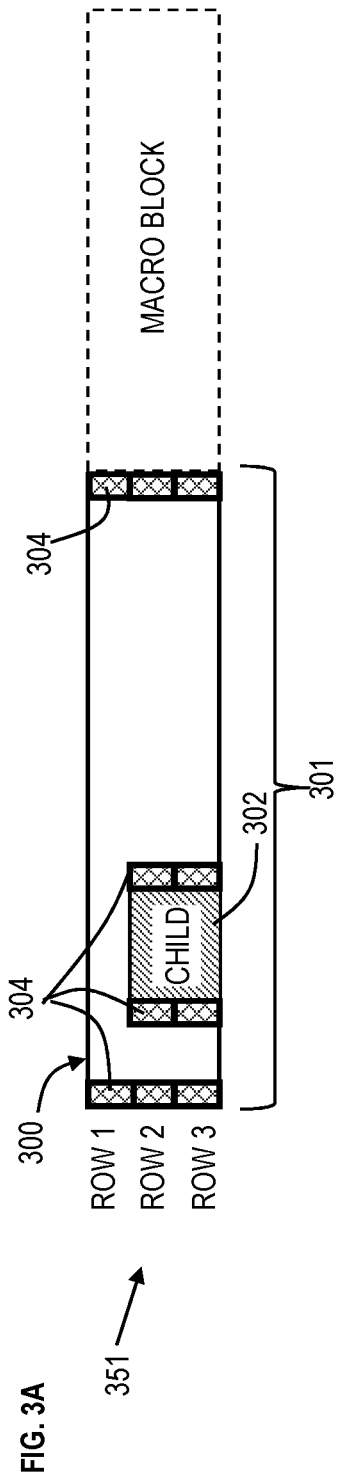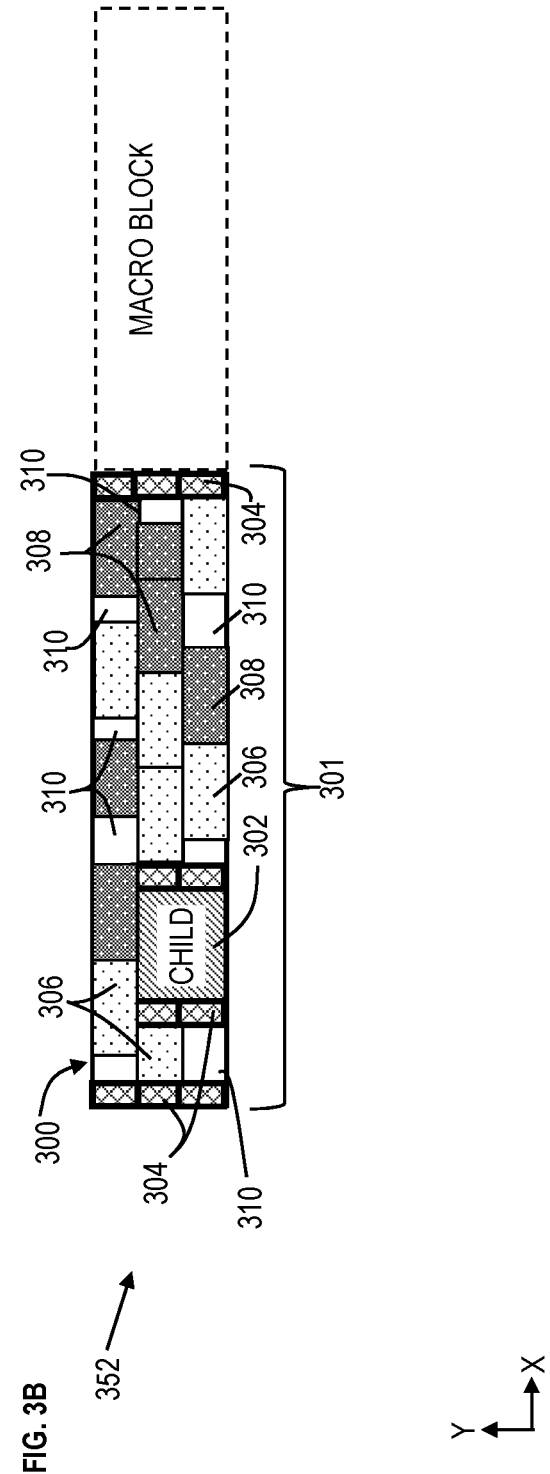

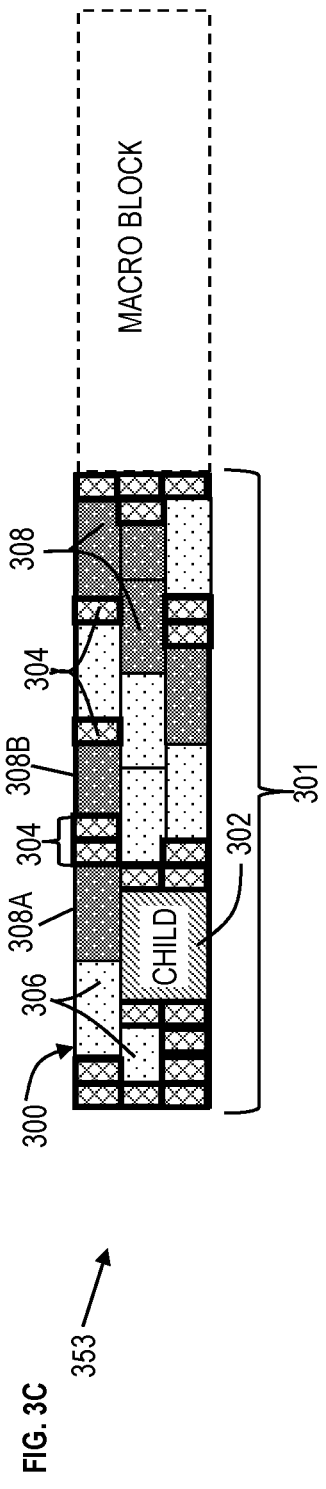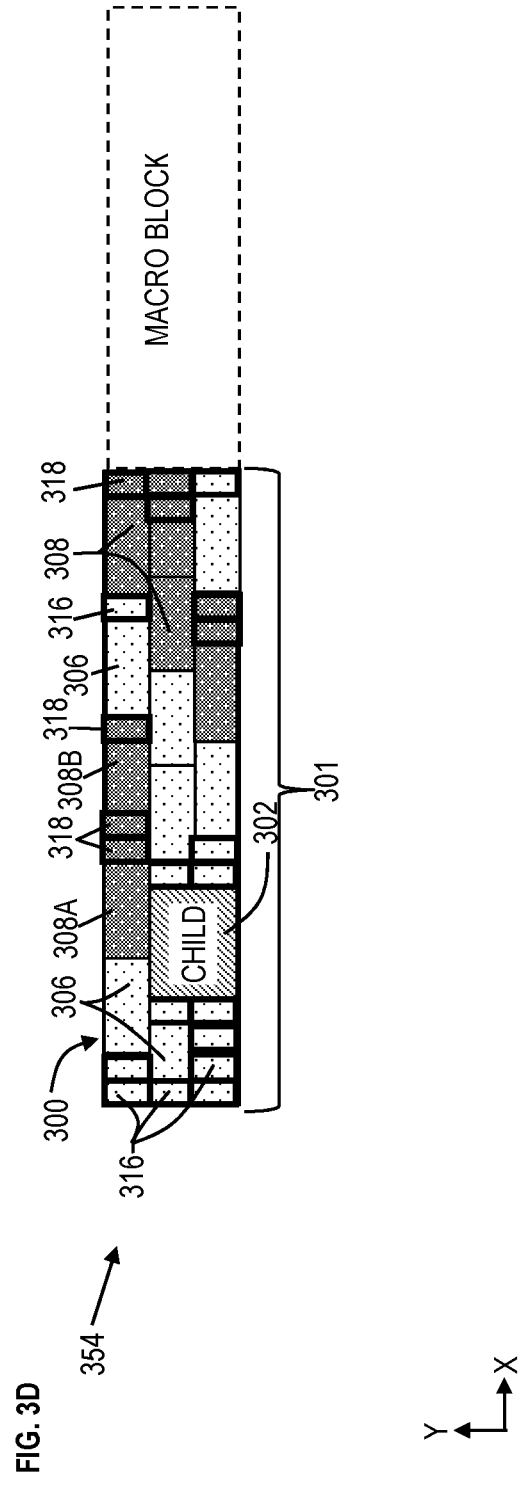

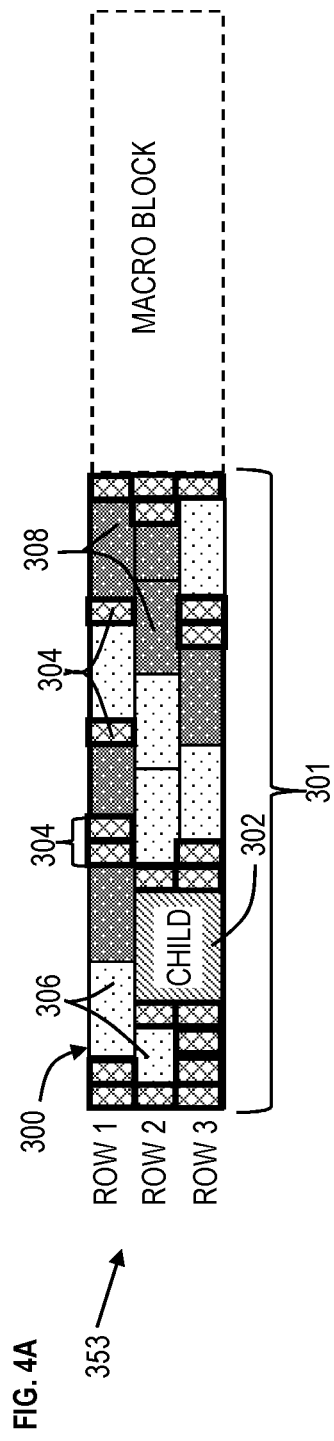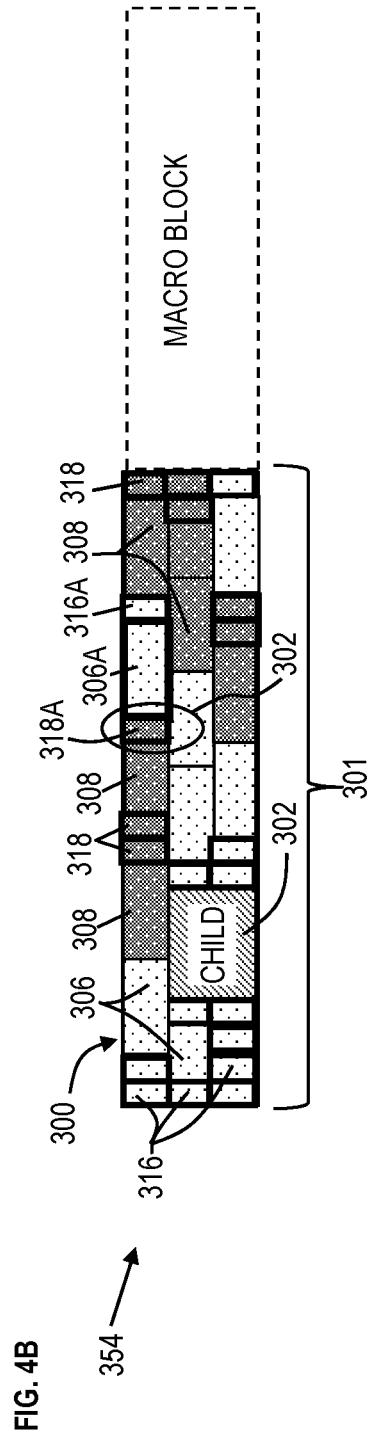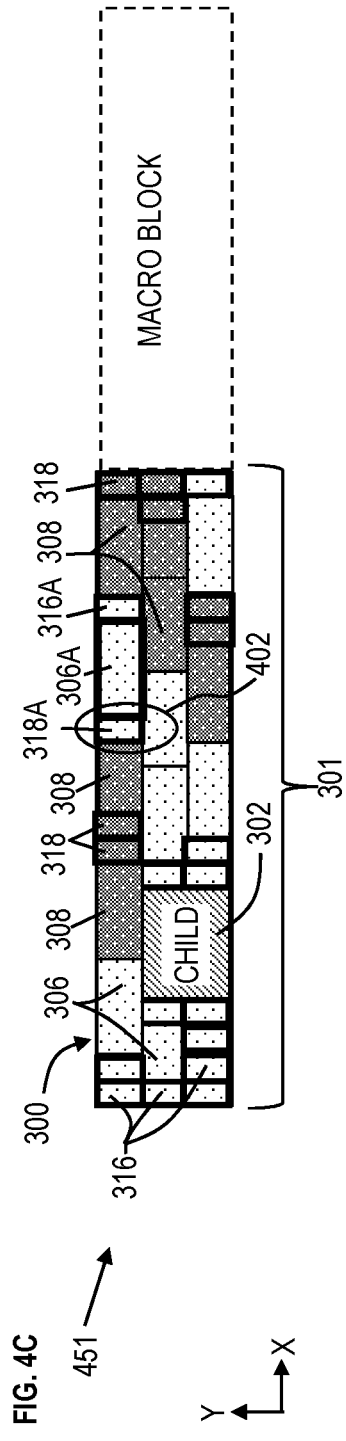
FIG. 4A
FIG. 4B
FIG. 4C

US 10,885,260 B1

FIN-BASED FILL CELL OPTIMIZATION

BACKGROUND

The present invention generally relates to methods and resulting structures for semiconductor devices, and more specifically, to providing fin-based fill cell optimization.

The individual components of an integrated circuit (IC) are extremely small and its production demands precision at an atomic level. IC fabrication is a complex process during which electronic circuits are created in and on a wafer made out of very pure semiconducting material, typically silicon. The manufacturing is a multiple-step sequence which can be divided into two major processing stages, namely front-end-of-line (FEOL) processing and back-end-of-line (BEOL) processing. FEOL refers to the construction of the components of the IC directly inside the wafer. FEOL is the first portion of IC fabrication where the individual devices (such as transistors, capacitors, resistors, etc.) are patterned in the semiconductor. FEOL generally covers all steps up to the deposition of metal interconnect layers. FEOL contains all steps of CMOS fabrication needed to form fully isolated CMOS elements. The processes can include, but are not limited to, selecting the type of wafer to be used, chemical-mechanical planarization and cleaning of the wafer, shallow trench isolation (STI), transistor channel formation, gate module formation, and source and drain module formation. Such integrated circuits commonly include one or more fin field-effect transistors (FinFETs), which are multigate devices built on a substrate where the gate is placed on two, three, or four sides of the channel.

SUMMARY

Embodiments of the present invention are directed to providing fin-based fill cell optimization. A non-limiting example computer-implemented method includes receiving a semiconductor layout including at least a first logic cell, a second logic cell, and a fill cell. A left boundary of the fill cell is adjacent to the first logic cell and a right boundary of the fill cell is adjacent to the second logic cell. The method also includes determining a number of active left fins, a number of active right fins, and a number of active fill cell fins. The number of active left fins represents a number of active fins associated with a fin field-effect transistors (Fin-FET) structure of the first logic cell, the number of active right fins represents a number of active fins associated with a FinFET structure of the second logic cell, and the number of active fill cell fins represents a number of active fins associated with a FinFET structure of the fill cell. The method also includes comparing the number of active left fins, the number of active right fins, and the number of active fill cell fins to a set of fin rules. Responsive to determining that the semiconductor layout violates the set of fin rules based on the comparison, the method includes modifying the semiconductor layout to change the number of active fill cell fins to satisfy the set of fin rules.

Other embodiments of the present invention implement features of the above-described method in computer systems and computer program products. Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A depicts a stage in building a semiconductor device according to embodiments of the invention;

FIG. 3B depicts a stage in building the semiconductor device after further operations according to embodiments of the invention;

FIG. 3C depicts a stage in building the semiconductor device after further operations according to embodiments of the invention;

FIG. 3D depicts a stage in building the semiconductor device after further operations according to embodiments of the invention;

FIG. 4A depicts a stage in building a semiconductor device according to embodiments of the invention;

FIG. 4B depicts a stage in building the semiconductor device after further operations according to embodiments of the invention;

FIG. 4C depicts a stage in building the semiconductor device after further operations according to embodiments of the invention;

Figure 1:
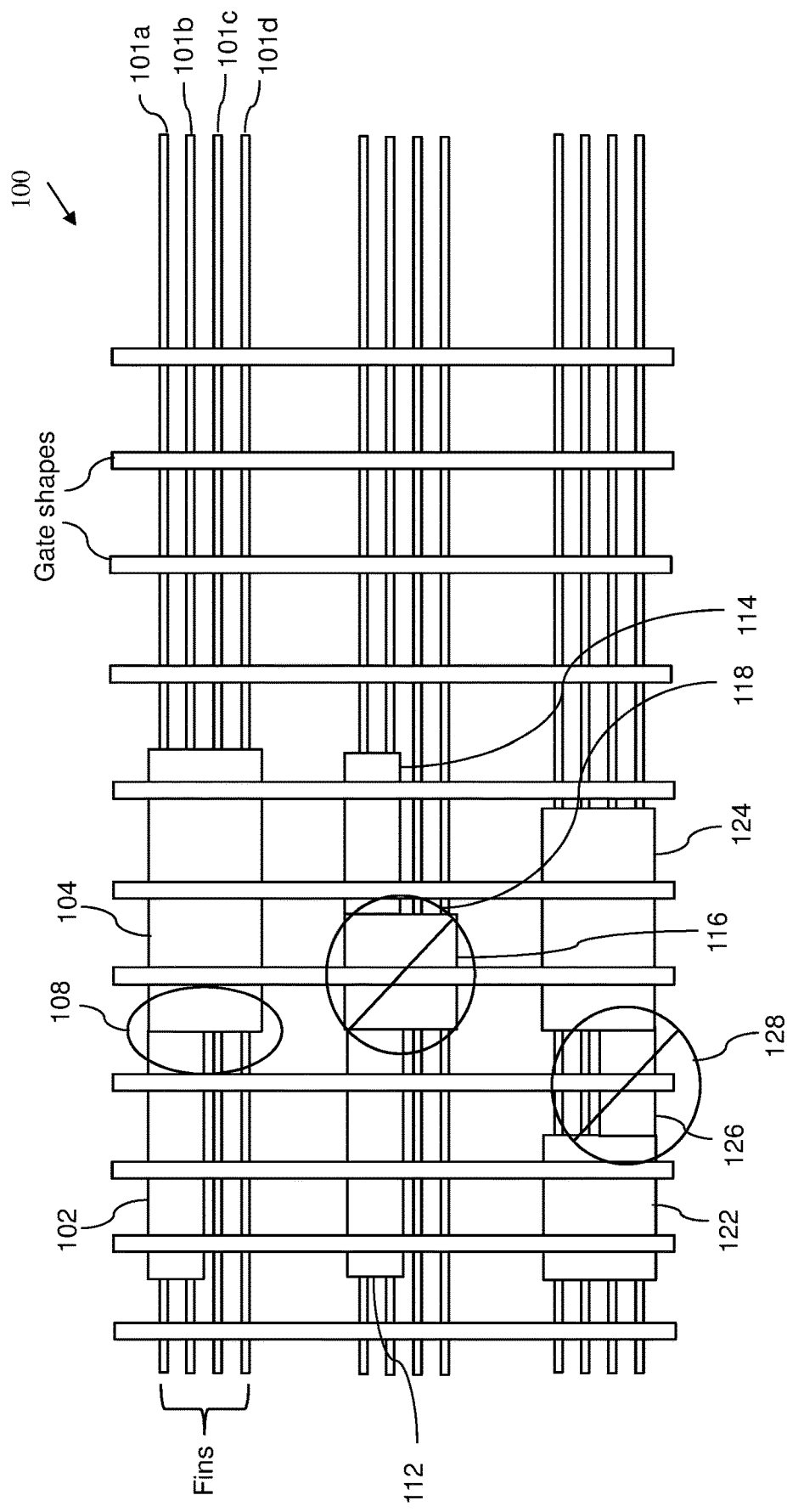
FIG. 1 illustrates an example circuit layout in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Very-large-scale integration (VLSI) is the process of creating an integrated circuit (IC) by combining billions of transistors into a single chip. Integrated circuit layout, also known as IC layout, IC mask layout, or mask design, is the representation of an integrated circuit in terms of planar geometric shapes which correspond to the patterns of metal, oxide, or semiconductor layers that make up the components of the integrated circuit. When using a standard process, where the interaction of the many chemical, thermal, and photographic variables is known and carefully controlled, the behavior of the final integrated circuit depends largely on the positions and interconnections of the geometric shapes. Using a computer-aided layout tool, the layout engineer or layout technician places and connects all of the components that make up the chip such that they meet certain criteria, typically performance, size, density, and manufacturability.

Design rule checking or check(s) (DRC) is the area of electronic design automation that determines whether the physical layout of a particular chip layout satisfies a series of recommended parameters called design rules. Design rule checking is a major step during physical verification signoff on the design. Design rules are a series of parameters provided by semiconductor manufacturers that enable the designer to verify the correctness of a mask set. Design rules are specific to a particular semiconductor manufacturing process. A design rule set specifies certain geometric and connectivity restrictions to ensure sufficient margins to account for variability in semiconductor manufacturing processes, so as to ensure that the parts work correctly. Two of the most basic design rules are a width rule that specifies the minimum width of any shape (e.g., the minimum width of a threshold voltage (VT) shape used to define device performance) in the design and a spacing rule that specifies the minimum distance between two adjacent shapes. These rules will exist for each layer of a semiconductor manufacturing process.

Similar to DRC issues caused by improper gaps between neighboring VT cells, DRC issues can also arise when there is a mismatch between the number of active fins on either side of a fin field-effect transistor (FinFET). As will be appreciated by those of skill in the art, fins carry current from one side of a gate to the other side. Due to semiconductor processing limitations, it may be impossible to print certain gaps between a pair of regions based on the number of active fins in each region. Further complicating FinFET design requirements, there is a minimum difference in active fin counts between neighboring gates, where the lithographic rounding occurring on the vertices associated with a large "step" between active fins may exceed the technology limits and cause undesirable interactions between the active fins and gates. For example, if there are adjacent two-fin finFET and three-fin FinFETs, the corner rounding of active fins may be contained between gates as desired; however, a gap between a one-fin FinFET and a four-fin FinFET may introduce sufficient corner rounding to cause a fin to partially span a gate, interfering with its structure and the characteristics of other fins or gates in the vicinity. Such corner rounding causes incomplete or unresolved fins on the outer edges, resulting in incorrect functionality. This is a known issue that is addressed by DRC rules that provide guidance for what active fin counts are allowed among adjacent gates. A fill cell placed in any gap between gates must provide continuity between the cells on its east and west edges to ensure proper stitching occurs, according to a predetermined list of legal transitions. Thus, there is a need to provide improved fill cells that account for the active fin counts on each side of the gap/cell.

The main objective of design rule checking (DRC) is to achieve a high overall yield and reliability for the design. If design rules are violated, the design may not be functional. To meet this goal of improving die yields, DRC has evolved from simple measurement and Boolean checks, to more involved rules that modify existing features, insert new features, and check the entire design for process limitations such as layer density. A completed layout consists not only of the geometric representation (shape requirements) of the design, but also data that provides support for the manufacture of the design. While design rule checks do not validate that the design will operate correctly, they are constructed to verify that the structure meets the process constraints for a given design type and process technology (for fabrication).

DRC software can take as input a layout in the OASIS format (or the older GDSII standard format) and a list of rules specific to the semiconductor process chosen for fabrication. From these, DRC software produces a report of design rule violations that the designer may or may not choose to correct. Carefully "stretching" or waiving certain design rules is often used to increase performance and component density at the expense of yield. Some examples of DRCs in IC design include: active to active spacing, well to well spacing, the minimum channel length of the transistor, minimum metal width, metal to metal spacing, metal fill density (for processes using CMP), poly density, ESD and I/O rules, antenna effect, etc.

Turning now to an overview of technologies that are more specifically relevant to aspects of the invention, an algorithm for automated front-end-of-line shape merging cell placement and optimization for very-large-scale integration (VLSI) can be used to freely place standard cells with varying alignment periodicities, routing needs, and critical path locations in integrated circuits. Randomly placed shapes can be merged to ensure DRC compliance while maintaining performance integrity regardless of cell placement solution, neighboring cell timing sensitivities, and concurrent hierarchical design boundaries. Use of such an algorithm can result in the creation of a DRC compliant "brick wall" of cells that ensure there are no 1 or 2 gate pitch gaps between threshold voltage (VT) shapes by filling gaps between active cells with fill cells such that all circuit rows are completely filled with cells. However, such cell placement and filling does not generally account for DRC issues caused by mismatches in the number of active fins in adjacent regions of a FinFET structure.

Turning now to an overview of the aspects of the invention, one or more embodiments of the invention address one or more of the above-described shortcomings of the prior art by disclosing techniques for providing fin-based fill cell optimization. The disclosed techniques provide an improved method of generating fill cells that account for the number of fins on each side of the fill cell, so that the fill cell does not violate DRC rules. An algorithm can dynamically select which type of single-pitch (fill-1) cell to insert based on the number of active fins present on the left edge of the fill cell and the number of active fins present on the right edge of the cell. The method can include identifying the number of active fins on each edge, dynamically selecting which type of fill-1 cell to insert based on the DRC rules and iteratively filling in all gaps in this manner.

Turning now to a more detailed description of aspects of the present invention, FIG. 1 depicts a circuit layout 100 that shows examples of an acceptable and unacceptable active fin layouts within a FinFET structure. As shown, a circuit layout 100 can have one or more groups of 4 parallel fins (e.g., fins 101a, 101b, 101c, 101d) and a plurality of gate shapes ("gates") may intersect the one or more groups of fins at an approximately perpendicular angle to form various FinFETs. As will be understood by those of skill in the art, the FinFET structure (i.e., the fins and gates) can have various diffusion regions that are regions that are doped during the manufacturing process to allow current to flow through the corresponding fins. For example, as shown in FIG. 1, a first diffusion region 102 (which may also be referred to simply as the "first region") covers a first fin 101a and a second fin 101b, but does not cover the third fin 101c and fourth fin 101d. Thus, the first region 102 can be considered to have two active fins (i.e., fins 101a, 101b) and two inactive fins (i.e., fins 101c, 101d). By contrast, a second diffusion region 104 that is adjacent to the first region 102 covers all four fins and can thus can be considered to have four active fins. An edge 108 between the first region 102 and the second region 104 shows that a region with two active fins is directly adjacent to a region with four active fins. According to some embodiments, when the horizontal width (i.e., the number of PC pitches) of adjacent regions (such as regions 102 and 104 shown in FIG. 1) are above a threshold distance (e.g., greater than 1-pitch or greater than 2-pitches), then the disparity between the number of active fins in adjacent regions does not violate a DRC rule.

However, as is shown in the next set of fins in FIG. 1, DRC rule violations can occur where there are regions that have a width of less than a threshold width (e.g., 1-pitch or less). In this case, a first region 112 and a second region 114 that each have 2 active fins are separated by a third region of a small width that has 4 active fins. The strike-through indication 118 over the third region 116 indicates that this configuration of the numbers of active fins in adjacent regions violates a DRC rule by causing "an illegal bump" of a region having an increased number of active fins (i.e., 4 fins) that stick out (i.e., create a "bump") in the middle of an otherwise long span of regions having 2 active fins. Similarly, the next grouping of fins shows a first region 122 and a second region 124 each having 4 active fins that are separately by a third region 126 that only has 2 active fins, which as shown by the strike-through indication 128 over the third region 126, violates a DRC rule by causing "an illegal notch" of a region having an reduced number of active fins (i.e., 2 fins) that create a notch in the middle of an otherwise long span of regions having 4 active fins.

Figure 2:
FIG. 2 illustrates an example set of fin rules in accordance with one or more embodiments of the present invention.

Rules that define which configurations of adjacent fin counts are problematic and which are acceptable may be provided by the manufacturer of an integrated circuit. The table 200 in FIG. 2 provides an example of a set of rules that dictate whether active fin combinations are acceptable or not. The table specifies the number of active fins on the left of a fill cell (e.g., first region 122), the number of active fins on the right of a fill cell (e.g., second region 124), the number of active cells in the fill cell (e.g., third region 126) and the rule to be enforced based on these numbers. For example, if there are 4 active fins on the left, 4 active fins in the fill cell and 4 active fins on the right, then this configuration is allowed. However, if there are for example, 4 active fins on the left, 3 active fins in the fill cell and 2 active fins on the right, then this configuration violates the fin rules and is not allowed. In this latter case, as shown by the chart, it would be desirable to change the number of fins in the fill cell to be either 4 active fins, which is allowed but not preferred, or to 2 active fins, which is the preferred configuration given the number of active fins on the left and right of the fill cell according to the rules. It will be understood that the table 200 provided in FIG. 2 is merely an example set of fin rules, and it is contemplated that variations of these rules may be used in various embodiments. Although the examples described herein (including table 200 shown in FIG. 2) are generally directed towards configurations involving 2, 3 and/or 4 active fin counts, it should be appreciated that this disclosure is not intended to be limited to such cases and it is contemplated that the techniques described herein may also be used in conjunction with technologies that include 1 active fin, 5 active fins, 6 active fins, or any other number of active fins that is possible.

Figure 5:
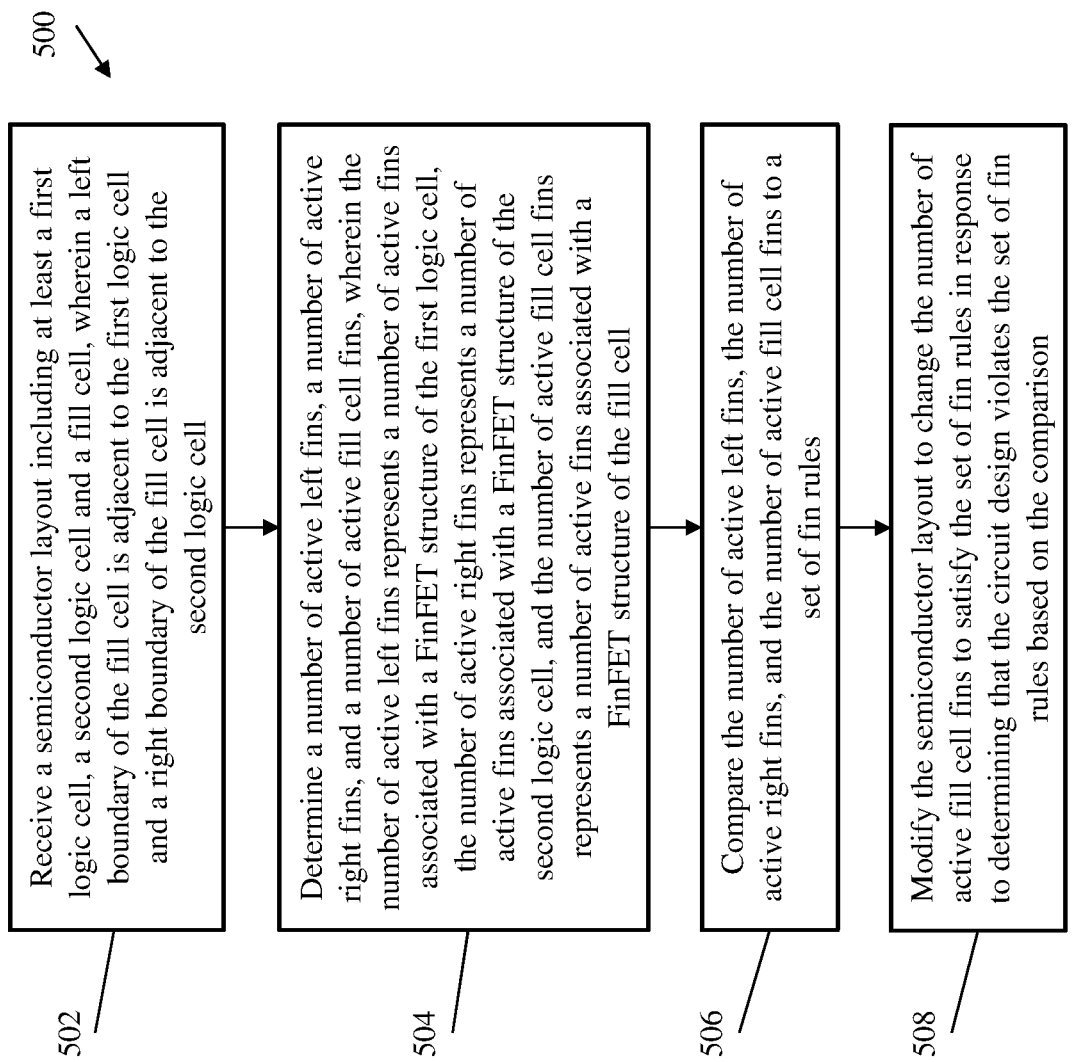
FIG. 5 illustrates a flow diagram of a process for providing fin-based fill cell optimization in accordance with one or more embodiments of the present invention.

FIGS. 3A, 3B, 3C, 3D, FIGS. 4A, 4B, and 4C and their associated descriptions provide techniques to freely place standard cells with varying alignment periodicities, routing needs, and critical path locations in a semiconductor layout for building a semiconductor device in accordance with embodiments of the present invention. FIG. 5 provides a computer-implemented method for providing fin-based fill cell optimization to a semiconductor layout in accordance with one or more embodiments of the present invention. According to some embodiments, semiconductor layouts such as those shown in FIGS. 3A, 3B, 3C, 3D, FIGS. 4A, 4B, and 4C and/or the method disclosed in FIG. 5 can be implemented by a computer system, such as computer system 600 shown in FIG. 6. The computer system 600 has one or more software applications 602 configured to function and implement operations as discussed herein. The software applications 602 provide a mechanism for enabling the merging of randomly placed shapes to ensure DRC compliance while maintaining performance integrity regardless of cell placement solution, neighboring cell timing sensitivities, and concurrent hierarchical design boundaries. According to embodiments of the invention, software applications 602 can function as an automated tooling to create a DRC compliant "brick wall" and then further optimize that "brick wall" (via machine learning or iterative processing) to guarantee performance and/or enhance the performance of the semiconductor device, including providing fin-based cell optimization.

Figure 6:
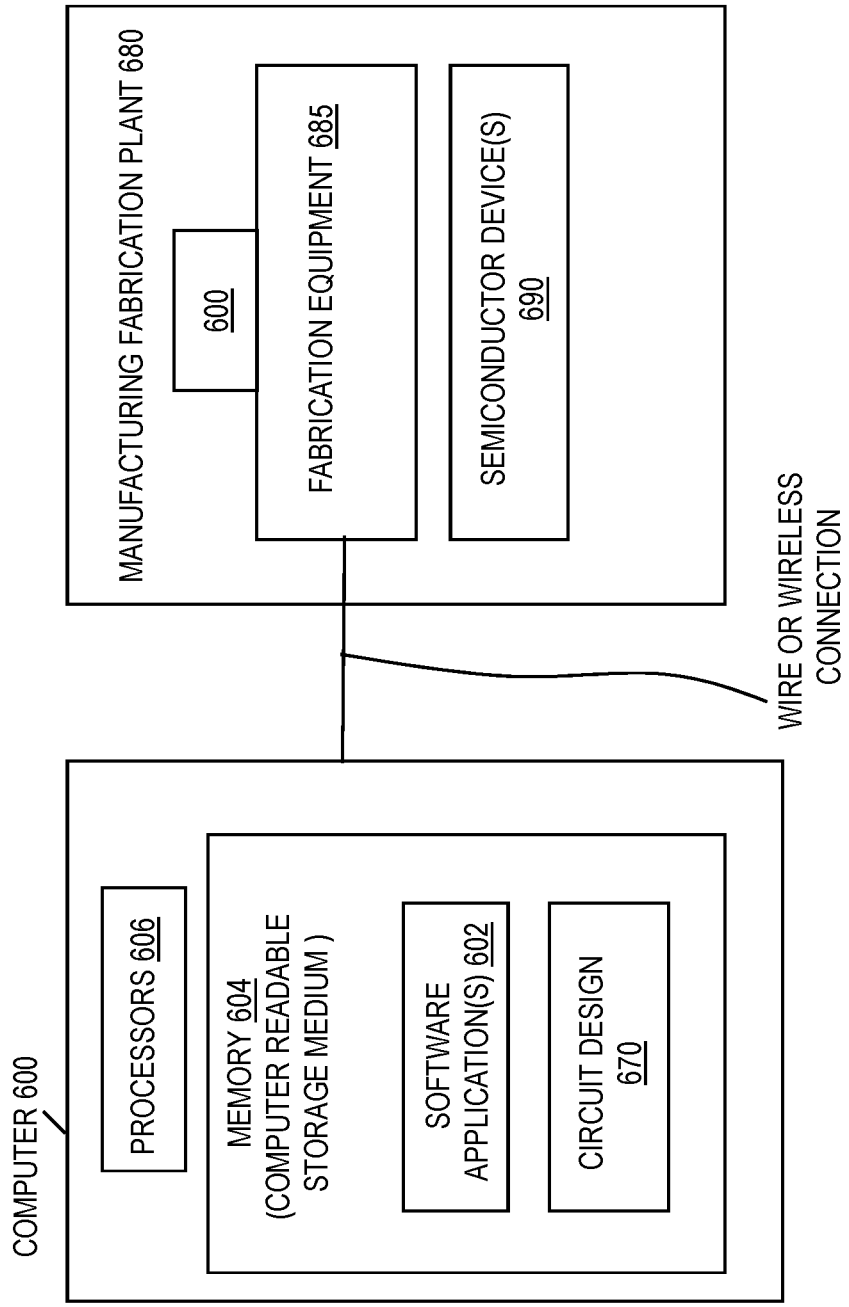
FIG. 6 depicts a system of a computer system integrated with a manufacturing fabrication plant according to embodiments of the invention.

FIGS. 3A, 3B, 3C and 3D depict stages of building a semiconductor device according to embodiments of the invention. A semiconductor layout 300 can be constructed by the software application 602 of the computer 600 to build the semiconductor device (e.g., an integrated circuit). The computer 600 is configured to guarantee design rule cleanliness (i.e., pass) for the semiconductor device before and/or without requiring a design rule check. The software applications 602 can include, be integrated with, be coupled to, and/or can function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 600 is coupled to, integrated with, and/or part of the fabrication equipment 685 at the manufacturing fabrication plant 680 (so as to communicate with and/or control operations of the fabrication equipment 685) to thereby fabricate semiconductor device(s) 690 as depicted in FIG. 6, as understood by one skilled in the art. The computer 600 includes one or processors 606 configured to execute one or more software applications 602 in memory 604. The computer 600 receives input of a design 670 for the semiconductor device 690, and the computer 600 is configured to develop/form the semiconductor layout 300 for the semiconductor device in order to build the semiconductor device. The semiconductor layout 300 is a physical design released to the manufacturing fabrication (Fab) plant 680 and physically fabricated by the fabrication equipment 685 to produce the semiconductor device 690. The manufacturing fabrication plant 680 builds the photo mask from the semiconductor layout 300 as a physical design, and then builds the actual product using the photo mask. The product is an integrated circuit (i.e., semiconductor device 690) on a wafer according to the semiconductor layout 300 (physical design). There may be numerous integrated circuits on a wafer, and each integrated circuit may be diced into an individual chip.

As shown in FIG. 3A, the computer 600 can be configured to place/insert cells against hierarchical boundaries during prefill. For example, stage 351 depicts the semiconductor layout 300 which can have numerous macro blocks, for example, hundreds, thousands, etc. For ease of understanding, only two macro blocks are illustrated. Although only macro block 301 is discussed, it should be understood that discussions about macro block 301 apply by analogy to other macros blocks in the semiconductor layout 300. A macro block is a collection of cells (with each cell containing one or more transistors) that provides a useful layer of hierarchical abstraction for designing an integrated circuit that may contain billions of transistors. To form the semiconductor device, the computer 600 places a child cell 302 in the macro block 300 and places empty cells at the hierarchical boundaries, as depicted at stage 351. According to some embodiments, "empty cells" can be cells that do not contain logic gates, but can include a large number of shapes and dummy gates to stich shapes between their left and right edges. In some embodiments, empty cells may have a default number of active fins. For illustration purposes, the hierarchical boundaries are defined to be lateral (e.g., on the left or right sides of identified cells) in the x-axis. The child cell 302 is a child macro block that is hierarchically within (larger) parent macro block 301. The child cell 302 has two boundaries which are on the left and right sides in the x-axis. The child cell 302 can include one or more regions having, for example, 2 active fins, 3 active fins or 4 active fins. Likewise, the macro block 301 is surrounded by other macro blocks and can be hierarchically within an even larger macro block. The macro block 301 has two boundaries, which are on the left and right in the x-axis. As such, the computer 600 is configured to laterally insert empty cells 304 on the sides (left and right in this illustration) of the child cell 302 and (parent) macro block 301 of the semiconductor layout 300. At stage 351 in FIG. 3A, the empty cells 304 are used to ensure that, despite any additional cells that may be added in future steps, the empty cells 304 can be changed to an appropriate active fin count such that there will always be a solution that will satisfy the design rule checks with respect to the child cell 302 and the larger macro block 301. The placement of these empty cells 304 ensures/guarantees that the design rule check can be met such that no design rule check is necessary because this is a correct-by-construction technique. According to some embodiments, the empty cells 304 are not identified as regions having a defined number of active fins at this point, which means the empty cells 304 have not been filled with any shape. However, as mentioned above, in some embodiments, empty cells 304 can include default shapes and a default number of active fins that can be changed to a different number of active fins at a later point. The empty cells 304 serve as a placeholder in the semiconductor layout 300.

As shown in FIG. 3B, the computer 600 is configured to add functional cells (which may also be referred to as "logic cells") in the semiconductor layout 300 for building the semiconductor device 690. The functional cells are the cells (having many devices) that perform operations in the semiconductor device. The design shape is the type of functional cell, and functional cells can include, for example, 2-fin regions (i.e., a region having 2 active fins), 3-fin regions, and 4-fin regions. The functional cells include and/or operate as various logic blocks such as inverters, AND gates, OR gates, etc. At stage 352 in FIG. 3B, the computer 600 adds a first type of logic (i.e., functional) cells 306 and a second type of logic cells 308 as simple illustrations, where each type of logic cell may represent a logic cell having specific number of active fins. It should be appreciated that other functional cells can also be added during stage 352. Each of the functional cells perform operations in an integrated circuit as understood by one skilled in the art. In the semiconductor layout 300, the computer 600 leaves blank spaces 310 in which no functional cells have been added and where no fill cells have been added, as depicted in FIG. 3B.

As shown in FIG. 3C, post-fill is performed in which the computer 600 is configured to fill in the remaining areas or blank spaces 310 with additional empty cells 304. Stage 353 in FIG. 3C depicts additional empty cells 304 added in each of the previous blank spaces 310. Some empty cells 304 can have a predefined minimum width in the x-axis which is guaranteed to meet the design rule check. However, the width in the x-axis of one or more empty cells 304 may not meet the predefined minimum spacing between two functional cells to avoid a violation of a set of fin rules, such as the set of fin rules shown in FIG. 2. According to some embodiments, none of the empty cells has a number of active fins designated at this time and are thus "finless". This occurs as post-functional placement because the functional cells have already been placed. In some embodiments, the empty cells may be filled in having a default number of active fins (e.g., 2 active fins, 3 active fins or 4 active fins).

As shown in FIG. 3D, post postfill using smart fin boundary fill is performed in which the computer 600 is configured to replace the "finless" fill cells with cells of the appropriate number of active fins or change the number of fins from the default number in one or more empty cells to ensure design rule cleanliness (i.e., ensure the design rules are met even without being required to run the design rule check). At stage 354 in FIG. 3D, the computer 600 is configured to execute a fill routine that fills in and/or replaces each empty cell 304 with a cell having the appropriate number of active fins resulting in non-functional cells (i.e., "fill cells"), such as cells 316 and 318 (which are shown to be "filled in" in a similar pattern to functional cells 306 and 308). The non-function cells can be, for example, 2-fin regions, 3-fin regions, or 4-fin regions. The non-functional cells 318 have a designated number of active fins as, for example, 2-fin regions, and the non-functional cells 316 have a designated number of active fins such as, for example, 3-fin regions. Other types of non-functional cells can be included too (e.g., 4-fin region cells). The non-functional cells 316 and 318 each contain transistors corresponding to the designated number of active fins, and the number of active fins is a physical (structural) property of the respective transistors in the non-functional cells and 316 and 318. For example, the transistors in the non-functional cells 316 and 318 have their number of fins determined by the shape of the diffusion region with respect to a FinFET structure having 4 fins, as shown in FIG. 1.

The fill routine can be implemented in the software application 602 and/or coupled to the software application 602. Each semiconductor layout 300 is a grid on a wafer/substrate, and the grid has rows (for example rows 1, 2, and 3 are identified in FIG. 3A). As one example of the fill routine of the software application 602, the fill routine scans from left-to-right (in the x-axis) in each row in the semiconductor layout 300. The fill routine scans each row, for example, starting with the top row and/or scans all three rows concurrently. As the fill routine (i.e., software application 602) scans, it identifies both the empty cells 304 and the functional cells (e.g., first type of logic cells 306, second type of logic cells 308, etc.). As the fill routine scans from left-to-right (as one example), each time the fill routine encounters a pair of functional cells separated by a fill cell having a width that is less than a predetermined threshold (e.g., 1 pitch or less), the routine may designate or modify the number of active fins associated with the fill cell to satisfy a set of fin rules, such as the rules shown in FIG. 2. For example, continuing the assumption that that the fill routine is scanning from left-to-right in the x-axis in the top row (row 1), it is assumed that the fill routine encounters a first logic cell 308A (functional cell) and a second logic cell 308B that are separated by one or more empty cells 304 or fill cells (i.e., cells that have already been filled in to have a default number of active fins). The routine may then determine the number of active fins on the right and left edges of the empty/fill cell(s) and based on the fin rules, can fill in the empty cell or modify the fill cell to have a specified number of active fins that satisfy the fin rules. For example, if the cell on the left edge has 4 active fins and the cell on the right edge has 2 active fins, the routine will ensure that the empty/fill cell(s) are designed to have either 2 active fins (preferred) or 4 active fins (not preferred), but in no case will the empty/fill cell be designated to have 3 active fins, as this would generate a rule violation. This replacement process continues until the end of the first row, and then the subsequent rows are processed and filled accordingly. In some situations, there is no functional cell immediately to the left of some empty cells 304 in a row because the particular row starts with empty cells 304, as illustrated in row 1. In such a case, while scanning from left-to-right, the fill routine (e.g., software application 602) is configured to identify each of the starting empty cells 304 to the left of a functional cell (i.e., having a number of fins) and designate the starting empty cells 304 to have the same number of active fins as the functional cell to the right of the starting empty cells 304 when the empty cells 304 have no functional cell immediately to the left in the macro block 301. As can be seen, the first two non-functional cells 316 in the first row (row 1) in stage 354 (scanning from left-to-right) are designated to have the same number of active fins as the cell 306 immediately to the right. It is noted that this is one example of a fill routine configured to function according to embodiments of the invention. By analogy, the fill routine could scan from right-to-left.

As seen in stage 354, the macro block 301 (and any others) is filled with cells in order to build the semiconductor device 690, and the semiconductor layout 300 does not require a design rule check to be performed because the semiconductor layout 300 was constructed as a guaranteed clean fill strategy. Each cell can be considered a collection of design shapes as understood by one skilled in the art.

Technical benefits and advantages of one or more embodiments of the present invention include providing a cell-based correct-by-construction technique which does not simply merge shapes in a semiconductor device but guarantees meeting design rule check without or prior to any design rule check. Thereby, the correct-by-construction technique improves the integrated circuit (i.e., semiconductor device 690), and improves the operation of the integrated circuit (e.g., used in a computer system) by preventing potential errors discussed herein. Technical benefits can include (1) runtime improvement which is part of the general cell fill routine, (2) flow simplification in which there is no need for DRC-compliant shape file generation, DRC run, and/or fix-up script, and (3) hierarchical correctness built into the algorithm instead of generating/fixing against check cells.

Further optimization can be made in addition to the guaranteed design rule check cleanliness (i.e., pass) for the semiconductor device 690 in FIG. 6. FIGS. 4A, 4B, and 4C depict further stages (or optimization) of building the semiconductor device 690 according to embodiments of the invention, where the building of the semiconductor device can continue from stage 353 in FIG. 4A. As previously discussed, the post postfill smart fin boundary fill occurs by filling in all the previous blank spaces 310 (in FIG. 3B) with empty cells 304 as depicted in stage 353 in FIG. 4A.

The software application 602 can be configured to perform critical path detection and transition avoidance. As a result, the software application 602 may identify, for example, given cell 306A as a critical cell and/or critical path in the macro block 301 (and/or in the semiconductor device) as depicted in stage 354 in FIG. 4B. Additionally, the software application 602 is configured to find potential performance issues that can arise with respect to the critical cell and/or critical path which is cell 306A. Because the critical cell 306A abuts/touches a region having a different number of active fins which is non-functional cell 318A, the software application 602 (determines and) identifies the non-functional cell 318A (highlighted by 302) as causing a (potential) performance issue. In other words, the critical cell 306A is predefined in advance such that the software application 602 knows that cell 306A is a critical functional cell. The critical cell 306A can be predefined in advance in the design 670 provided to the software application 602. Because the abutting cells of different numbers of fin counts are to be avoided, the software application 602 performs (active fin number) transition avoidance. As one example, the software application 602 is configured to change the neighboring abutting non-functional cell 318A from a region having a first number of active fins to a region having the same number of active fins as the critical cell 306A as depicted in stage 451 in FIG. 4C. As another example, suppose the critical cell 306A abuts/touches a region which is a functional cell that has a different number of active fins than critical cell 306A, software application 602 can move that functional cell having the different number of active fins to another location that does not abut critical cell 306A such that the critical cell will only be abutted by cells of the same number of active fins. Optionally, the critical cell 306A can be moved such that it only abuts cells of the same number of active fins.

Performing critical path detection and transition avoidance improves variation tolerance in the integrated circuit (e.g., semiconductor device 690). This could further include modeling of neighboring cell influences, in order to minimize this cell to cell performance impact. The cell to cell performance impact is having a cell of one active number of fins abutting/against a cell of a different active number of fins.

Additionally, software application 602 is configured to perform process emulation retiming for performance and yield. The software application 602 can also exploit this neighbor concept to provide multiple timing rule options for a given library cell depending on its neighboring cells, in order to reflect the performance impact of different numbers of active fins on each edge to the library cell's transistor timing. For example, if a functional cell is placed with 2-fin regions on both sides, it would use a timing rule 1 reflecting the transistor performance impact of 2-fin regions on each side and their impacts to nearby transistors within the library cell. When placed with 3-fin regions on both sides, the library cell would use a timing rule 2, when placed with a 2-fin region on one side and 3-fin region on another side, it would use a timing rule 3, etc. The process described above is iterative and thus continues such that further replacements can occur to improve performance of the integrated circuit (e.g., semiconductor device 690).

Turning now to FIG. 5, a flow diagram of a method 500 for providing fin-based fill cell optimization in accordance with an embodiment is shown. In one or more embodiments of the present invention, the method 500 may be embodied in software that is executed by elements of a computer 600 as shown in FIG. 6, computer elements located within a network that may reside in the cloud, such as the cloud computing environment 50 illustrated in FIG. 7 and described herein above and with respect to FIGS. 7 and 8. In other embodiments, the computer elements may reside on a computer system or processing system, such as the processing system 900 described herein above and illustrated in FIG. 9, or in some other type of computing or processing environment.

The method 500 begins at block 502 and includes receiving (e.g., via computer 600) a semiconductor layout including at least a first logic cell, a second logic cell, and a fill cell. According to some embodiments, a left boundary of the fill cell is adjacent to the first logic cell and a right boundary of the fill cell is adjacent to the second logic cell. In other words, the fill cell is positioned between the first logic cell and second logic cell. Although the method describes a single fill cell, in some embodiments, there may be more than one fill cell positioned between the first logic cell and the second logic cell. According to some embodiments, if the total of the fill cell(s) exceeds a predetermined threshold width (e.g., 1-pitch, 2-pitches, 3-pitches, etc.), then the computer 600 may determine that there is no fin-related DRC issue and the method may terminate at this point or skip to the next functional cell.

As shown at block 504, the method includes determining (e.g., via computer 600) a number of active left fins, a number of active right fins, and a number of active fill cell fins. According to some embodiments, the number of active left fins can represent a number of active fins associated with a FinFET structure of the first logic cell, the number of active right fins can represent a number of active fins associated with a FinFET structure of the second logic cell, and the number of active fill cell fins can represent a number of active fins associated with a FinFET structure of the fill cell. According to some embodiments, a "FinFET structure" may refer to a group of four fins (e.g., fins 101a, 101b, 101c, 101d as shown in FIG. 1) and any intersecting gate shapes. As described above with respect to FIG. 1, the number of active fins associated with a given cell can be determined by the number of fins covered by an active diffusion region of the cell.

As shown at block 506, the method includes comparing (e.g., via computer 600) the number of active left fins, the number of active right fins, and the number of active fill cell fins to a set of fin rules. For example, the system may compare the fin numbers to a table such as the table 200 shown in FIG. 2 to determine whether the configuration of the three cells is allowed or ruled out (i.e., disallowed) under the rules.

As shown at block 508, the method includes modifying (e.g., via computer 600) the semiconductor layout to change the number of active fill cell fins to satisfy the set of fin rules in response to determining that the semiconductor layout violates the set of fin rules based on the comparison. According to some embodiments, modifying the semiconductor layout to change the number of active fill cell fins can include changing a shape of a diffusion region associated with the fill cell (e.g., in the circuit design) to change a number of fins covered by the diffusion region. As will be appreciated by those of skill in the art, the diffusion region can represent a region of a FinFET structure that is doped to allow current to flow through fins encompassed by the diffusion region. According to some embodiments, determining that the semiconductor layout violates the set of fin rules can include determining that a relationship between the number of active left fins, the number of active right fins, and the number of active fill cell fins in the semiconductor layout violates a design rule check rule of the set of fin rules. For example, with reference to the table 200 in FIG. 2, if there are 4 active fins in the first logic cell (i.e., the left cell), 3 active fins in the fill cell and 2 active fins in the second logic cell (i.e., the right cell), then this configuration violates the fin rules and would result in a DRC violation. In some embodiments, determining that the semiconductor layout violates the set of fin rules can further include determining that a width of the fill cell is below a predetermined threshold width. In other words, according to some embodiments, even if the numbers of active fins in the cells matches a case that would be ruled out according to the fin rules, if the width of the fill cell width (e.g., the horizontal width of cell 116 shown in FIG. 1) exceeds a predetermined threshold, the configuration may nonetheless be acceptable. Thus, in some embodiments, before comparing the number of active fins to the fin rules, the system may first determine whether the width of the fill cell is less than a predetermined threshold, such as for example, a distance of 1 pitch, 2 pitches or 3 pitches.

According to some embodiments, determining that the semiconductor layout violates the set of fin rules based on the comparison can include determining that the fill cell is causing an illegal bump and modifying the semiconductor layout to change the number of active fill cell fins can include reducing the number of active fill cell fins. For example, as shown in FIG. 1, an illegal bump can occur where a third region 116 (i.e., the fill cell) has more active fins than the surrounding first region 112 and third region 114, causing it to stick out like a bump.

In some embodiments, determining that the semiconductor layout violates the set of fin rules based on the comparison can include determining that the fill cell is causing an illegal notch and modifying the semiconductor layout to change the number of active fill cell fins can include increasing the number of active fill cell fins. For example, as shown in FIG. 1, an illegal notch can occur where a third region 126 (i.e., the fill cell) has fewer active fins than the surrounding first region 122 and third region 124, causing it to appear as a notch-like crevice.

According to some embodiments, the method 500 can further include approving (i.e., indicating that the design is acceptable as is) a portion of the semiconductor layout that comprises the first logic cell, the second logic cell and the fill cell with respect to fin requirements in response to determining that a width of the first logic cell, a width of the second logic cell and a width of the fill cell each exceed a predetermined threshold width. According to some embodiments, DRC rules may specify that adjacent cells having different active fin counts may not violate the DRC rules provided that the cells are of sufficient width. For example, as shown in FIG. 1, the first region 102 and the second region 104 have relatively long widths when compared to, for example, the third region 116 shown in the second group of fins, and therefore would not violate the DRC rules. In some embodiments, the system may approve the portion of the semiconductor layout that comprises the first logic cell, the second logic cell and the fill cell with respect to fin requirements in response to determining that a width of the fill cell exceeds a predetermined threshold, such as for example, a threshold distance of 1 pitch, 2 pitches or 3 pitches.

According to some embodiments, the method 500 can be performed iteratively across various portions of a semiconductor layout (e.g., such as a semiconductor layout 300 shown in FIG. 3C) to change the number of active fill cell fins of a number of different fill cells of the semiconductor layout. For example, in some embodiments, the method may iteratively examine every set of three adjacent cells in a circuit layout and either approving the configuration or modifying a fill cell to change the number of active fins in the fill cell to satisfy the fin rules. The routine may, for example, examine all cells in the first row of the circuit layout and then proceed to examine all cells in the second row of the circuit layout and so on. According to some embodiments, instead of examining every set of three cells in the circuit layout, the method may identify each fill cell and iteratively examine the adjacent cells of each fill cell to ensure DRC compliance with respect to active fin counts. Although the method 500 is described with respect to modifying a number of active fill cell fins associated with a fill cell, it should be appreciated that it is contemplated that the method could be adapted to instead determine and designate a number of active fins to associate with empty cells (i.e., cells with no predefined number of active fins) that are similarly positioned to the fill cells described above.

Additional processes may also be included. It should be understood that the process depicted in FIG. 5 represents an illustration, and that other processes may be added or existing processes may be removed, modified, or rearranged without departing from the scope and spirit of the present disclosure.

A further optimization to the aforementioned algorithms is to encode the left and right fin counts associated with any given library cell/book/macro in a separate file to abstract away the more detailed shapes within the library cell/book/macro. In this way, the routine that determines the appropriate fill cells to add does not need to examine the actual shapes, but can query the fin counts on the left and right edges more directly, with significant improvements in fill tool runtime and reductions in coding complexity.

Figure 7:
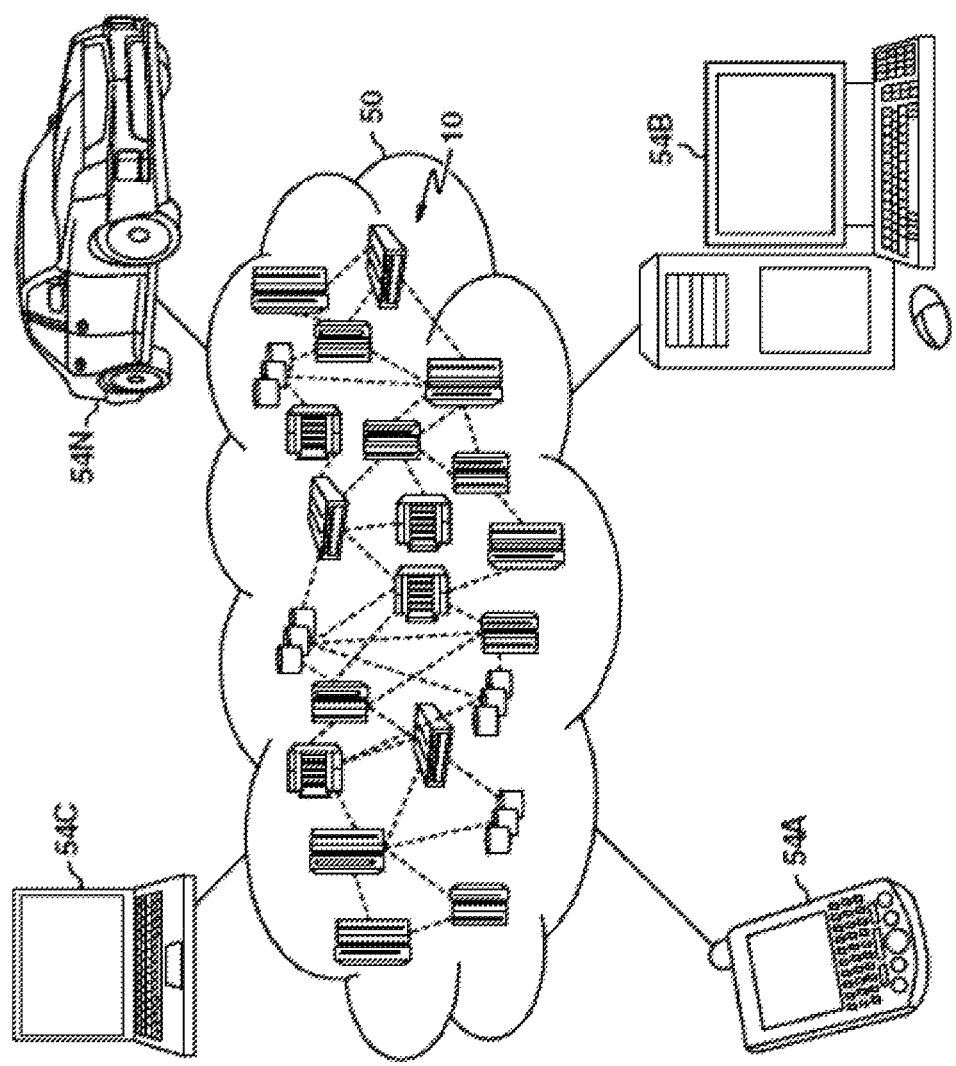
FIG. 7 illustrates a cloud computing environment according to one or more embodiments of the present invention.
Figure 8:
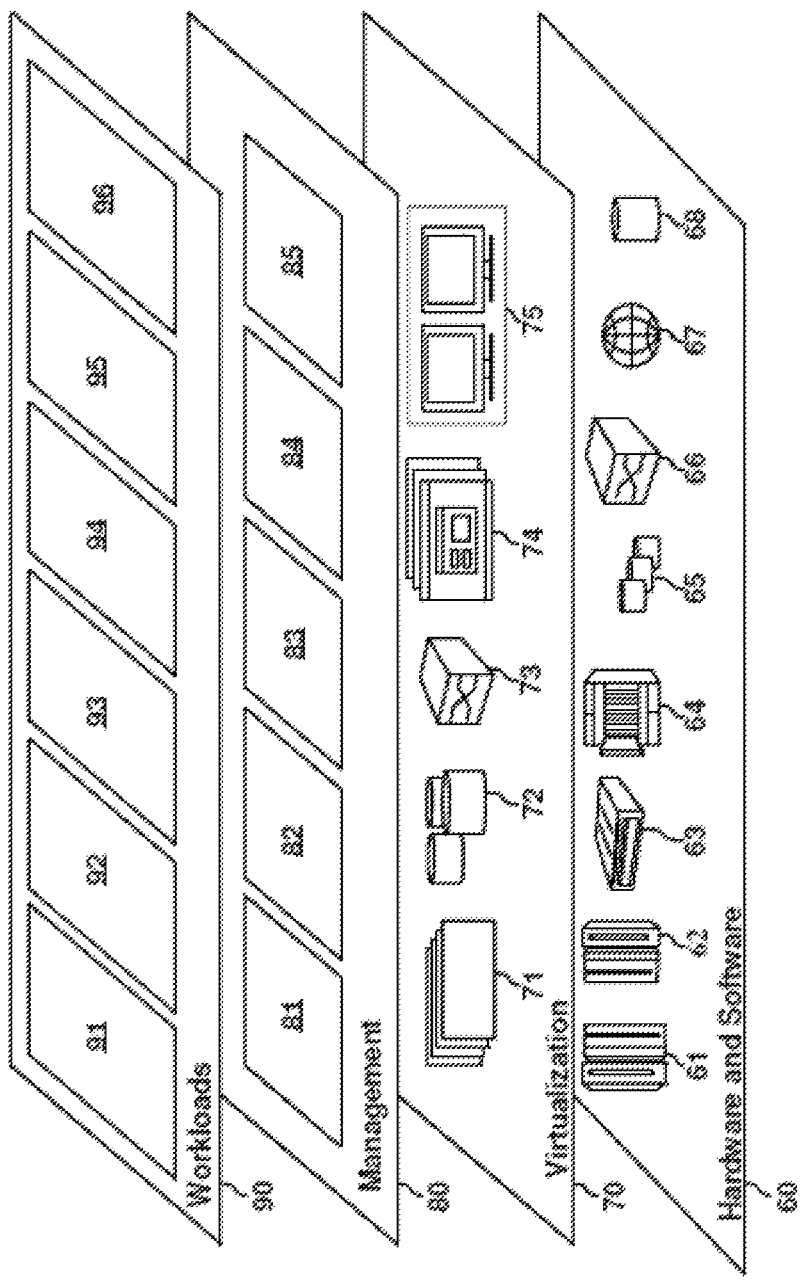
FIG. 8 illustrates abstraction model layers according to one or more embodiments of the present invention.

FIG. 7 depicts a cloud computing environment according to one or more embodiments of the present invention. FIG. 8 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing fin-based fill cell optimization 96.

Figure 9:
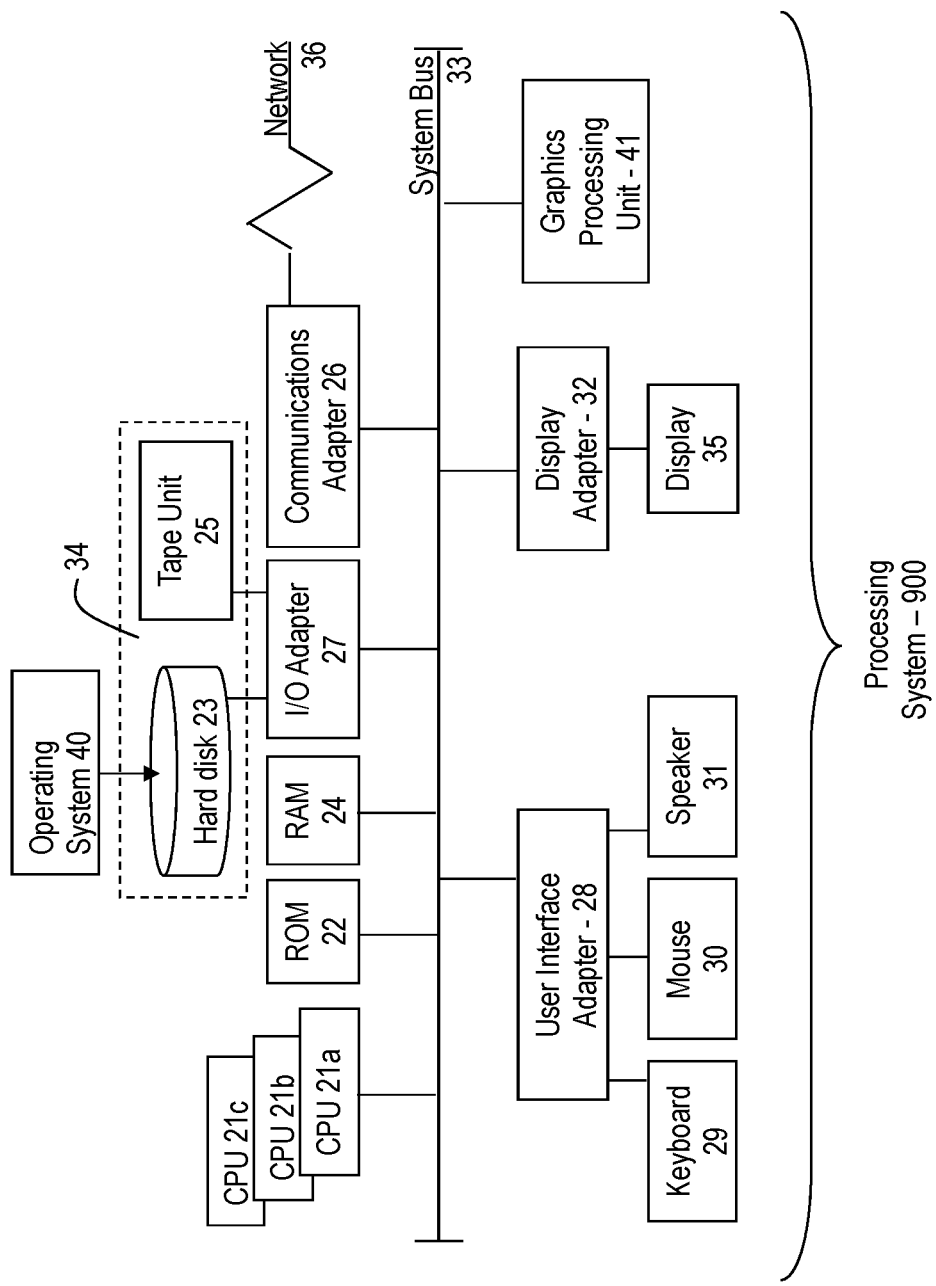
FIG. 9 illustrates a block diagram of a computer system for use in implementing one or more embodiments of the present invention.

FIG. 9 depicts a processing system for implementing one or more embodiments of the present invention. It is understood that one or more embodiments of the present invention are capable of being implemented in conjunction with any other type of computing environment now known or later developed. For example, FIG. 9 depicts a block diagram of a processing system 900 for implementing the techniques described herein. In accordance with one or more embodiments of the present invention, computer 600 and/or system 900 can be an example of a cloud computing node 10 of FIG. 7. In the embodiment shown in FIG. 9, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. The RAM 24, ROM 22, and mass storage 34 are examples of memory 19 of the processing system 900. A network adapter 26 interconnects system bus 33 with an outside network 36 enabling the processing system 900 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic semiconductor layout ed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 900 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a computer system comprising a memory having computer readable instructions and one or more processors for executing the computer readable instructions, a semiconductor layout comprising at least a first logic cell, a second logic cell, and a fill cell, wherein a left boundary of the fill cell is adjacent to the first logic cell and a right boundary of the fill cell is adjacent to the second logic cell;
determining, by the computer system, a number of active left fins, a number of active right fins, and a number of active fill cell fins, wherein the number of active left fins represents a number of active fins associated with a fin field-effect transistors (FinFET) structure of the first logic cell, the number of active right fins represents a number of active fins associated with a FinFET structure of the second logic cell, the number of active fill cell fins represents a number of active fins associated with a FinFET structure of the fill cell, and the fill cell is a non-functional cell comprising one or more transistors corresponding to the number of active fill cell fins;
comparing, by the computer system, the number of active left fins, the number of active right fins, and the number of active fill cell fins to a set of fin rules; and
responsive to determining that the semiconductor layout violates the set of fin rules based on the comparison, modifying, by the computer system, the semiconductor layout to change the number of active fill cell fins to satisfy the set of fin rules.

2. The computer-implemented method of claim 1, wherein modifying the semiconductor layout to change the number of active fill cell fins comprises changing a shape of a diffusion region associated with the fill cell to change a number of fins covered by the diffusion region to change the number of active fill cell fins between aligning with the first logic cell and aligning with the second logic cell.

3. The computer-implemented method of claim 2, wherein the diffusion region represents a region of a FinFET structure that is doped to allow current to flow through fins encompassed by the diffusion region.

4. The computer-implemented method of claim 1, wherein determining that the semiconductor layout violates the set of fin rules based on the comparison comprises determining that the fill cell is causing an illegal bump.

5. The computer-implemented method of claim 4, wherein modifying the semiconductor layout to change the number of active fill cell fins comprises reducing the number of active fill cell fins.

6. The computer-implemented method of claim 1, wherein determining that the semiconductor layout violates the set of fin rules based on the comparison comprises determining that the fill cell is causing an illegal notch.

7. The computer-implemented method of claim 6, wherein modifying the semiconductor layout to change the number of active fill cell fins comprises increasing the number of active fill cell fins.

8. The computer-implemented method of claim 1, wherein determining that the semiconductor layout violates the set of fin rules comprises determining that a relationship between the number of active left fins, the number of active right fins, and the number of active fill cell fins in the semiconductor layout violates a design rule check rule of the set of fin rules.

9. The computer-implemented method of claim 8, wherein determining that the semiconductor layout violates the set of fin rules further comprises determining that a width of the fill cell is below a predetermined threshold width.

10. The computer-implemented method of claim 1, further comprising:
responsive to determining that a width of the first logic cell, a width of the second logic cell and a width of the fill cell each exceed a predetermined threshold width, approving a portion of the semiconductor layout that comprises the first logic cell, the second logic cell and the fill cell with respect to fin requirements.

11. A system comprising:
a memory having computer readable instructions; and
one or more processors for executing the computer readable instructions, the computer readable instructions controlling the one or more processors to perform operations comprising:
receiving a semiconductor layout comprising at least a first logic cell, a second logic cell, and a fill cell, wherein a left boundary of the fill cell is adjacent to the first logic cell and a right boundary of the fill cell is adjacent to the second logic cell;
determining a number of active left fins, a number of active right fins, and a number of active fill cell fins, wherein the number of active left fins represents a number of active fins associated with a fin field-effect transistors (FinFET) structure of the first logic cell, the number of active right fins represents a number of active fins associated with a FinFET structure of the second logic cell, and the number of active fill cell fins represents a number of active fins associated with a FinFET structure of the fill cell, and the fill cell is a non-functional cell comprising one or more transistors corresponding to the number of active fill cell fins;
comparing the number of active left fins, the number of active right fins, and the number of active fill cell fins to a set of fin rules; and
responsive to determining that the semiconductor layout violates the set of fin rules based on the comparison, modifying the semiconductor layout to change the number of active fill cell fins to satisfy the set of fin rules.

12. The system of claim 11, wherein modifying the semiconductor layout to change the number of active fill cell fins comprises changing a shape of a diffusion region associated with the fill cell to change a number of fins covered by the diffusion region to change the number of active fill cell fins between aligning with the first logic cell and aligning with the second logic cell.

13. The system of claim 12, wherein the diffusion region represents a region of a FinFET structure that is doped to allow current to flow through fins encompassed by the diffusion region.

14. The system of claim 11, wherein determining that the semiconductor layout violates the set of fin rules comprises determining that a relationship between the number of active left fins, the number of active right fins, and the number of active fill cell fins in the semiconductor layout violates a design rule check rule of the set of fin rules.

15. The system of claim 14, wherein determining that the semiconductor layout violates the set of fin rules further comprises determining that a width of the fill cell is below a predetermined threshold width.

16. The system of claim 11, the operations further comprising:
responsive to determining that a width of the first logic cell, a width of the second logic cell and a width of the fill cell each exceed a predetermined threshold width, approving a portion of the semiconductor layout that comprises the first logic cell, the second logic cell and the fill cell with respect to fin requirements.

17. A computer program product comprising a computer readable storage medium having program instructions embodied therewith, the program instructions executable by a computer processor to cause the computer processor to perform a method comprising:
receiving a semiconductor layout comprising at least a first logic cell, a second logic cell, and a fill cell, wherein a left boundary of the fill cell is adjacent to the first logic cell and a right boundary of the fill cell is adjacent to the second logic cell;
determining a number of active left fins, a number of active right fins, and a number of active fill cell fins, wherein the number of active left fins represents a number of active fins associated with a fin field-effect transistors (FinFET) structure of the first logic cell, the number of active right fins represents a number of active fins associated with a FinFET structure of the second logic cell, and the number of active fill cell fins represents a number of active fins associated with a FinFET structure of the fill cell, and the fill cell is a non-functional cell comprising one or more transistors corresponding to the number of active fill cell fins;
comparing the number of active left fins, the number of active right fins, and the number of active fill cell fins to a set of fin rules; and
responsive to determining that the semiconductor layout violates the set of fin rules based on the comparison, modifying the semiconductor layout to change the number of active fill cell fins to satisfy the set of fin rules.

18. The computer program product of claim 17, wherein modifying the semiconductor layout to change the number of active fill cell fins comprises changing a shape of a diffusion region associated with the fill cell to change a number of fins covered by the diffusion region to change the number of active fill cell fins between aligning with the first logic cell and aligning with the second logic cell.

19. The computer program product of claim 18, wherein the diffusion region represents a region of a FinFET structure that is doped to allow current to flow through fins encompassed by the diffusion region.

20. The computer program product of claim 17, wherein determining that the semiconductor layout violates the set of fin rules comprises determining that a relationship between the number of active left fins, the number of active right fins, and the number of active fill cell fins in the semiconductor layout violates a design rule check rule of the set of fin rules.

* * * * *